United States Patent
Jagt et al.

(10) Patent No.: US 7,352,500 B2
(45) Date of Patent: Apr. 1, 2008

(54) FULL-COLOR ELECTROCHROMIC DISPLAY WITH STACKED IN CELL MONOCHROMIC ELECTROCHROMES

(75) Inventors: Hendrik Johannes Boudewijn Jagt, Eindhoven (NL); Nicolaas Petrus Willard, Eindhoven (NL); Mark Thomas Johnson, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 574 days.

(21) Appl. No.: 10/524,403

(22) PCT Filed: Jul. 1, 2003

(86) PCT No.: PCT/IB03/03030

§ 371 (c)(1),
(2), (4) Date: Feb. 11, 2005

(87) PCT Pub. No.: WO2004/017134

PCT Pub. Date: Feb. 26, 2004

(65) Prior Publication Data

US 2006/0066933 A1    Mar. 30, 2006

(30) Foreign Application Priority Data

Aug. 15, 2002  (EP) ................................. 02078378

(51) Int. Cl.
*G02F 1/15* (2006.01)
*G02F 1/153* (2006.01)

(52) U.S. Cl. ...................... 359/265; 359/267; 359/270; 359/271; 359/273; 359/274; 359/275; 359/254; 345/105; 313/506

(58) Field of Classification Search ........ 359/265–275, 359/315, 321; 349/139; 345/84, 85, 105, 345/108, 111; 347/135, 255; 313/483, 506; 204/192.26, 192.1; 427/108

See application file for complete search history.

(56) References Cited

U.S. PATENT DOCUMENTS

| | | | | | |
|---|---|---|---|---|---|
| 4,127,853 | A | * | 11/1978 | Leibowitz | 359/270 |
| 4,240,713 | A | * | 12/1980 | Leibowitz | 359/274 |
| 4,297,006 | A | * | 10/1981 | Bissar | 359/265 |
| 4,475,795 | A | * | 10/1984 | Leibowitz et al. | 359/267 |
| 4,728,177 | A | * | 3/1988 | Green | 359/270 |
| 4,749,260 | A | | 6/1988 | Yang et al. | |
| 5,189,549 | A | * | 2/1993 | Leventis et al. | 359/271 |
| 5,274,493 | A | * | 12/1993 | Couput et al. | 359/275 |
| 5,444,330 | A | * | 8/1995 | Leventis et al. | 313/506 |
| 5,446,577 | A | * | 8/1995 | Bennett et al. | 359/273 |
| 5,585,958 | A | * | 12/1996 | Giraud | 359/265 |
| 5,754,329 | A | * | 5/1998 | Coleman | 359/254 |

* cited by examiner

*Primary Examiner*—Loha Ben

(57) ABSTRACT

A display device comprising a plurality of independently addressable pixels (1) comprising: a first substrate (2); a counter-electrode (3); second substrate (4); a stack of electrochromic layers (5a, 5b, 5c) associated with said second substrate (4); an electrolyte (6) disposed between said counter-electrode (3) and said stack of electrochromic layers (5a, 5b, 5c). Said electrochromic layers (5a, 5b, 5c) are each independently addressable for switching operation; and separated from each other by layers of an electrolyte (7). A driving method for operating said pixel (1) comprises the steps of: providing at least one power line (8) which is selectively connectable to an electrochromic layer (5) or a working electrode (10) associated with said electrochromic layer (5); selectively applying to said power line (8) a bleaching or coloring voltage; addressing the electrochromic layer (5) which is to be bleached or colored; connecting said power line (8) to said addressed electrochromic layer (5); retaining the connection of said power line (8) during a hold period; and disconnecting said power line (8).

10 Claims, 4 Drawing Sheets

FULL-COLOR ELECTROCHROMIC DISPLAY WITH STACKED IN CELL MONOCHROMIC ELECTROCHROMES

FIELD OF THE INVENTION

The present patent application relates to the field of electrochromic display devices, and particularly to an apparatus for providing full-color operation to such display devices and a drive method therefor. More specifically, the present patent application relates to an efficient system for providing full-color operation for each pixel cell of electrochromic display devices.

BACKGROUND OF THE INVENTION

Recently electrochromic display devices have been studied as candidates for electronic paper type of displays. However, the slow switching speed and high power consumption of the electrochromic display technologies commercially available today do not meet the needs of the display market. Lately the trend has been towards the use of nano-materials, such as chemically modified nano-structured mesoporous films, for improving performance. Use of such materials has shown promising results. However, one of the remaining key issues with respect to electrochromic displays is the generation of color.

One prior art approach suggests selective color generation using a four layer light filter which comprises five transparent plates each having electrolytes formed on their facing surfaces. The plates, being glass or plastic, are coated with tin oxide or thin metallic transparent conductors on their facing surfaces. Disposed on one of the electrodes of each pair of facing electrodes is a thin layer (0.01 µm to 0.1 µm) of an electrochromic conducting polymer. Although four layers have been described, it is suggested that two or more layers may be used in any combination of voltages to allow the transmission of different colors and tints through the panel. A system of this type is disclosed in U.S. Pat. No. 4,749,260.

SUMMARY OF THE INVENTION

Accordingly, it is an object of the present invention to provide an improved apparatus for providing full color to an electrochromic display appliance.

This object is achieved by the apparatus according to the invention as specified in claim 1.

A further object of the invention is to provide an improved drive method for providing full color to an electrochromic display appliance.

This object is achieved by the method according to the invention as specified in claim 8.

Further advantageous embodiments of the invention are specified in the dependent claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote like elements throughout the several views.

DETAILED DESCRIPTION OF THE PRESENTLY PREFERRED EMBODIMENTS

Figure 1:
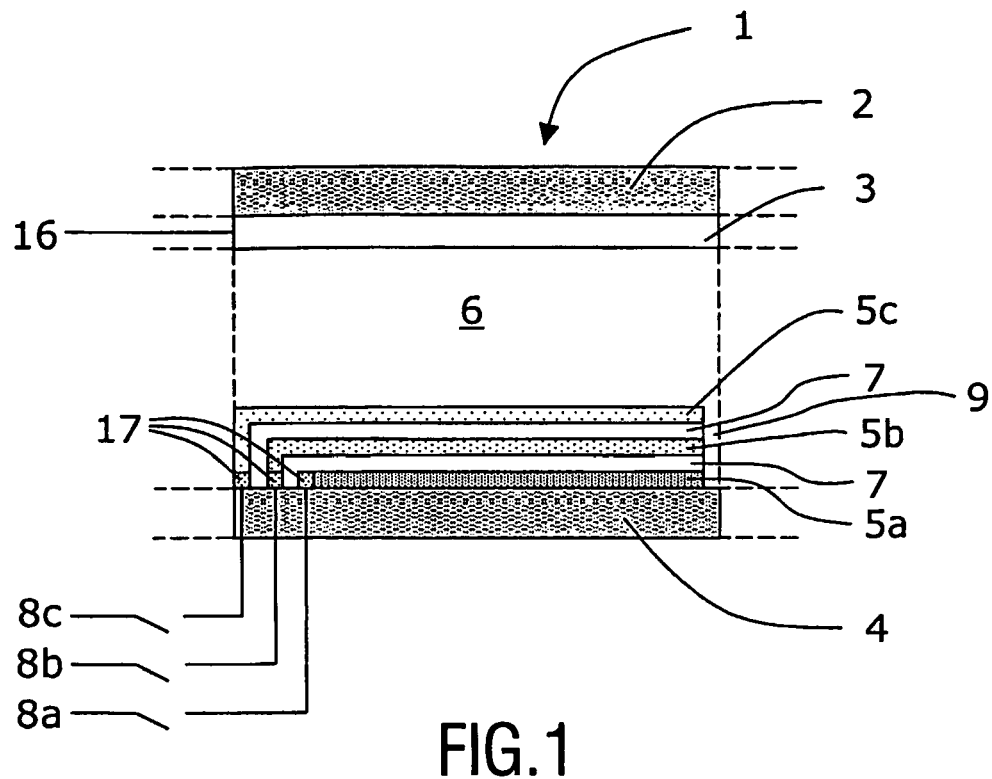
FIG. 1 discloses a schematic cross-sectional view of a pixel of a display device according to a first embodiment of the invention.

FIG. 1 shows a schematic cross sectional view of a pixel 1 of an electrochromic display according to a first embodiment. Each pixel of the electrochromic display is independently addressable and can be separated from other pixels either electrically or physically, in order to avoid cross-talk between pixels. The pixel 1 comprises: a first substrate 2, which is preferably transparent and made of a material such as a glass or from a plastic plate; a conductive counter-electrode 3 associated with said first substrate 2; a second substrate 4, which can be reflective or transparent; a stack of electrochromic-layers 5a, 5b, 5c associated with said second substrate 4; a transparent electrolytic material 6 disposed between said counter-electrode 3 and said stack of electrochromic-layers 5a, 5b, 5c and which is in contact with said counter-electrode 3 and the adjacent electrochromic-layer 5c in said stack of electrochromic-layers 5a, 5b, 5c. The electrochromic-layers 5a, 5b, 5c are independently addressable for switching operations. Each electrochromic-layer 5a, 5b, 5c can be reversibly switched between a transparent and a colored state by applying appropriate positive and negative voltages across the pixel cell. Full color operation is preferably achieved using the well-known subtractive color approach. According to the invention this is achieved through the stacking and independent addressing of three electrochromic-layers 5a, 5b, 5c in the pixel cell. Preferably, as shown in FIG. 1, thee monochromic electrochromic-layers are used. These three electrochromic-layers are preferably Cyan, Magenta and Yellow (CMY), which makes it possible to obtain all colors in a reflective display, including white and black, although as an alternative, also a Red, Green, Blue (RGB) color approach may be used. However, this is expected to result in reduced optical performance in the generation of complementary colors. The generation of the complementary (or primary) colors in combination with control of the electron flow towards the electrochromic-layer (gray-scale control) makes it possible to generate full-color operation. As the electrochromic-layers 5a, 5b, 5c in the stack need to be addressed independently, it is required to physically separate the electrochromic-layers 5a, 5b, 5c from each other in order to prevent cross-talk. This is preferably achieved using electrolyte layers 7 between the electrochromic-layers 5a, 5b, 5c, which electrolyte layers 7 are arranged to communicate with the electrolytic material 6 so that a direct ionic path exists between them, as will be described in more detail in the following. In order to ensure sufficient mechanical support, a solid-state like electrolyte, such as a polymeric electrolyte, is preferred. Moreover, the electrolyte is an essential part of the display cell, as it contains ions for charge compensation in the electrochemical oxidation or reduction reaction of the electrochromic-layers. The electrolyte layers 7 also facilitate rapid transport of counter-ions, which promotes a rapid response of the electrochromic reaction. In an alternative embodiment, the separating layers 7 between the stacked electrochromic-layers 5a, 5b, 5c may be composed of a porous insulator, which is filled with an electrolyte. In accordance with the embodiment of FIG. 1 electrodes contacting the electrochromic-layers are required on one or multiple sides of the pixel, in FIG. 1 illustrated as Indium Tin Oxide (ITO) tracks 17 on the substrate 4 connected to the power lines 8a, 8b, 8c, and with which ITO tracks 17 the electrochromic-layers are brought into contact, if 3required through so-called "via" holes. In such a configuration, electron transport occurs laterally across the pixel instead of the conventional electron transport in the depth direction. As the lateral dimension is much larger than the depth, electrochromic-layers 5a, 5b, 5c are required which provide a rapid transport of electrons. In such a case, the electrochromic-layer itself serves as an electrode. A known class of electrochromic materials with these properties are conductive polymers. These polymers can commonly be electrochemically switched from a high-conducting to a lower conducting state in which at the same time a difference in optical response occurs. A further advantage of the electrochromic class of conducting polymers is their process-ability and pattern-ability in ink-jet printing technologies or lithographic technologies. In order to prevent cross-talk in an active-matrix (AM) display, no pixel walls are required between adjacent pixels. It is possible to pixelate (pattern) the electrochromic-layers to prevent direct electron transport from one pixel to the next. A small space between the pixels is sufficient in such a case. The capacity of the counter-electrode 3 should be sufficient to provide an electrochemical counter reaction which supports all electrochromic-layers 5a, 5b, 5c in the stack. The capacity of the counter-electrode 3 should preferably be such that the redox state of the counter-electrode is not significantly altered when the various electrochromic layers are addressed with respect to said counter-electrode. Further, it is also possible to pixelate the counter-electrode 3. Each pixel of the display device can have its own counter-electrode 3, but there might also be one common counter-electrode plane, i.e. the counter-electrodes 3 of each pixel of the display device are connected to form one common counter-electrode. A line 16 for connection of the counter-electrode to a display drive circuit is shown in FIG. 1, which line 16, in case the counter-electrode is common to all pixels, need only connect once for the whole display device. A hole or gap 9 within the pixel (an electrolyte via, e.g. at the side(s) of the pixel) is required to ensure overall charge neutrality of the pixel cell and to facilitate ionic contact with the associated counter-electrode. When the display is used for transmissive operation, e.g. using a backlight, the entire pixel cell will be transparent when all the electrochromic-layers 5a, 5b, 5c are in transparent states. For reflective operation of the display, it is required that a reflector, preferably diffuse, is added to the substrate side of the pixel cell facing away from the viewer, which might be the first substrate 2 or the second substrate 4. The horizontal broken lines of FIG. 1 illustrate that the first substrate 2, the counter-electrode 3 as well as the second substrate 4 may be much larger and comprise additional pixels cells. The vertical broken lines are only used to illustrate the borders of the pixel cell 1 described.

Figure 2:
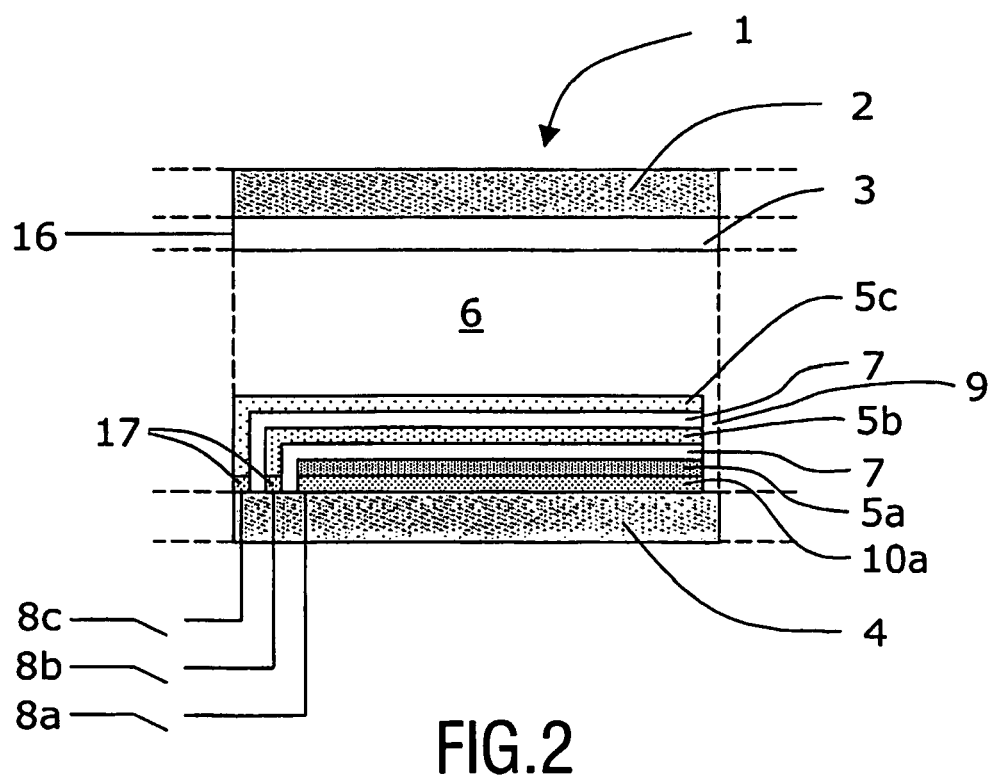
FIG. 2 discloses a schematic cross-sectional view of the pixel of a display device according to a second embodiment of the invention.

FIG. 2 illustrates an alternative embodiment where the pixel 1 in addition to what has been described with reference to FIG. 1 comprises an independently addressable working electrode 10a, e.g. composed of conventionally used transparent Indium Tin Oxide (ITO), arranged between the second substrate 4 and the electrochromic-layer 5a adjacent to the second substrate 4 in the stack of electrochromic-layers 5a, 5b, 5c. This electrochromic-layer 5a in this case is preferably deposited on the electrode 10a and may therefore be switched conventionally in the depth direction rather than laterally (as described above). Alternatively, this electrode 10a may be porous, such as nano-crystalline $TiO_2$, to further increase counter-ion diffusion, or promote electron transfer to an absorbed electrochromic species.

Figure 3:
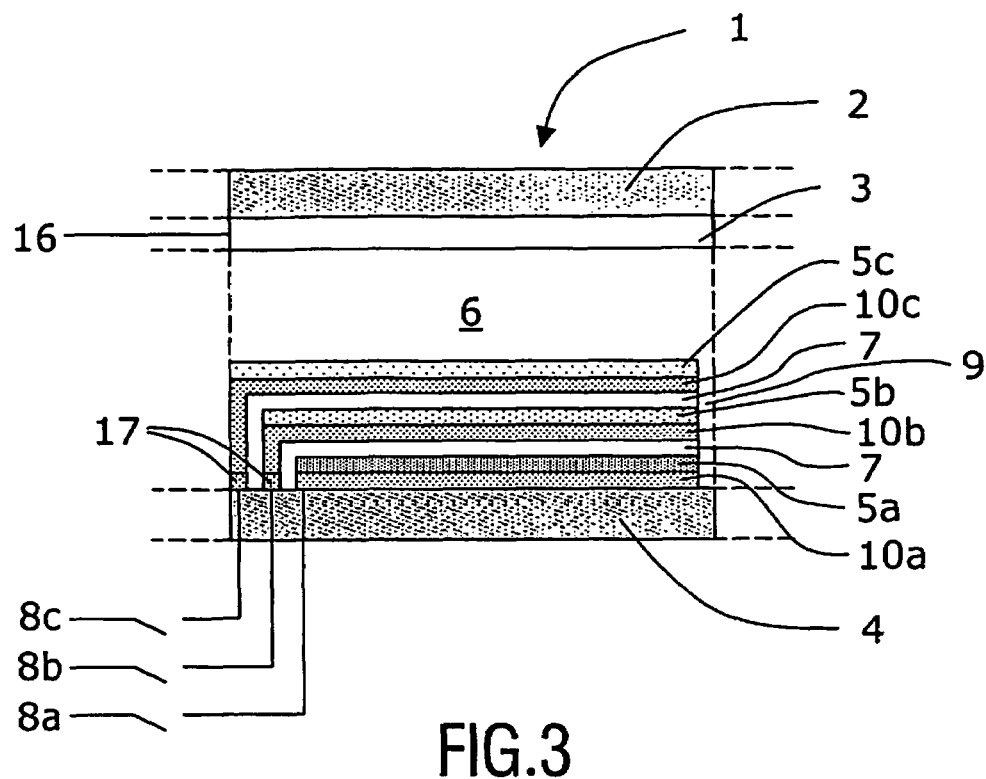
FIG. 3 discloses a schematic cross-sectional view of the pixel of a display device according to a third embodiment of the invention.

FIG. 3 illustrates a further alternative embodiment where the pixel 1 in addition to what has been described with reference to FIG. 1 comprises electrode layers 10a, 10b, 10c which are associated with and support the electrochromic-layers 5a, 5b, 5c. Each respective electrode layer 10a, 10b, 10c can be arranged, as shown in FIG. 3, such that its associated electrochromic-layer 5a, 5b, 5c is situated between said electrode layer and the counter-electrode 3, but it is also possible to arrange the electrode layers 10a, 10b, 10c between its associated electrochromic-layer and the counter-electrode 3. The electrode supporting one electrochromic-layer is separated from another electrochromic-layer by a mechanically supporting electrolyte 7, such as a solid-state or gel-like electrolyte, which may be a polymer electrolyte. The electrode layers 10b, 10c are brought into contact with the corresponding ITO tracks 17 through so-called "via" holes. A configuration in accordance with this embodiment adds to complexity and reflection losses, but provides an opportunity to switch the electrochromic-layers 5a, 5b, 5c conventionally in the depth direction and also enables the use of a larger span of electrochromic materials. Also these supporting electrodes 10a, 10b, 10c may be porous, such as nano-crystalline $TiO_2$, to further facilitate counter-ion diffusion or promote electron transfer to an absorbed electrochromic species.

Figure 4:
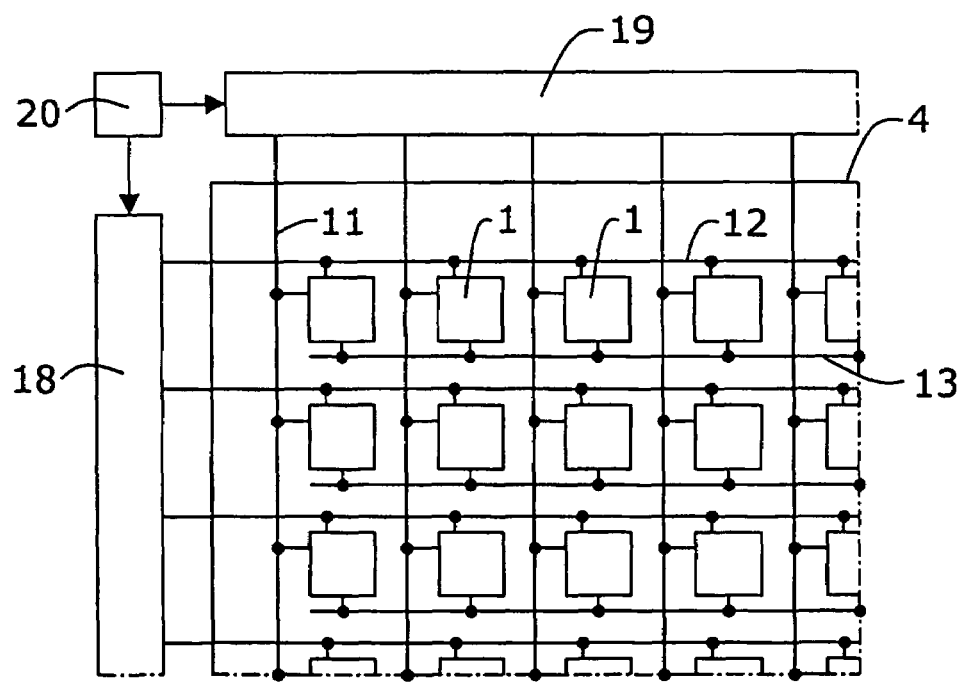
FIG. 4 discloses a general example of the structure of a conventional active-matrix display device.

Referring to FIG. 4, a general example of the structure of a conventional active-matrix display device is presented. The active-matrix display device comprises a panel having a row and column matrix array of regularly spaced pixels, denoted by the blocks 1, carried on a substrate 4, each comprising an electrochromic display element and an associated driving device controlling the current flow through the display element, and which are located at the intersections between crossing sets of row selection and column data address conductors, or lines, 12 and 11 also carried on the substrate. Only a few pixels 1 are shown for simplicity. The pixels 1 are addressed via the sets of address conductors by a peripheral drive circuit having outputs connected to the panel and comprising a row scanning driver circuit 18 generating scanning signals supplied to the row conductors 12 in sequence and a column data driver circuit 19 generating data signals supplied to the column conductors 11 and defining the display outputs from the individual pixel display elements, and a timing control unit 20 for controlling the operation of the circuits 18 and 19.

Each row of pixels is addressed in turn by means of a selection signal applied by the circuit 18 to the relevant row conductor 12 so as to load the pixels of the row with respective drive signals according to the respective data signals supplied in parallel by the circuit 19 to the column conductors 11. As each row is addressed, the data signals are supplied by the circuit 19 in appropriate synchronization.

Figure 5:
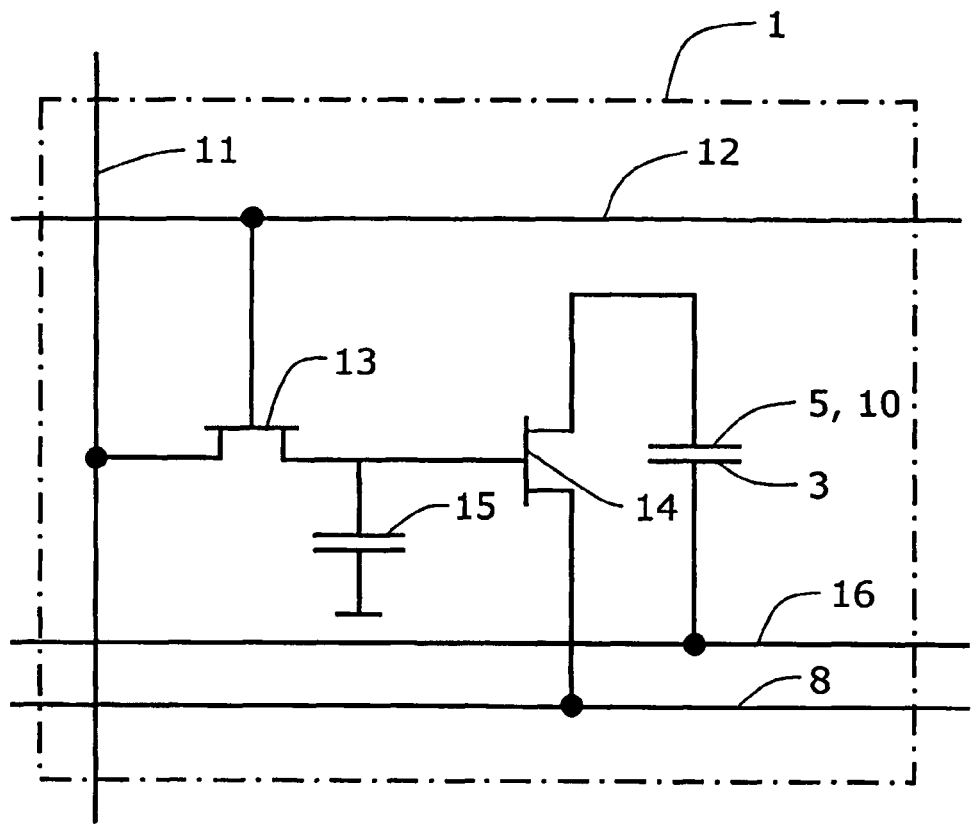
FIG. 5 discloses a simplified single power line drive circuit for an electrochromic pixel in accordance with the present invention.

FIG. 5 illustrates a single power line drive circuit for an electrochromic layer 5 or a working electrode 10 associated with said electrochromic layer 5 of an electrochromic pixel 1 which e.g. can be arranged in one of the blocks 1 of the active-matrix display of FIG. 1. Each pixel drive circuit includes a switching transistor 13, a driving transistor 14, a capacitor 15, and an electrochromic layer 5, possibly associated with a working electrode 10. The switching transistor 13 and the driving transistor 14 are preferably Thin Film Transistors (TFTs). A gate of the switching transistor 13 is connected to a row select electrode line 12 and a source of the switching transistor 13 is connected to a column data electrode line 11. A drain of the switching transistor 13 is connected to a gate of the driving transistor 14. A source of the driving transistor 14 is connected to a power line 8, and a drain of the driving transistor 14 is connected to the electrochromic layer 5 or the working electrode 10 associated with said electrochromic layer 5. The drive circuit is controllable via the column data input 11 and the row select input 12 providing control of application of the power line voltage to an electrochromic-layer 5 or the working electrode 10 associated with said electrochromic layer 5 of said pixel 1. Through use of the simple pixel circuit of FIG. 5 an electrochromic layer 5 of the pixel 1 can be colored and bleached. The operation is as follows: a power line 8 is set to a bleaching voltage; the display is addressed with two voltages, where a high voltage causes the drive transistor 14 to become conductive and a low voltage stops the transistor 14 conducting; a reset operation is performed through addressing all pixels 1 with high voltage, whereby the corresponding electrochromic-layers 5 of all pixels 1 are bleached (pixels which are already bleached will do nothing at this stage). The storage capacitor 15 ensures that the driving transistor 14 remains conductive during a hold period. All pixels 1 are addressed with a low voltage, which turns the driving transistor 14 off. The power line voltage is switched to a coloring voltage. Those pixels 1 the electrochromic layers 5 of which require coloring are addressed to a high voltage. The drive transistor 14 becomes conductive and coloring begins. The storage capacitor 15 ensures once again that the driving transistor 14 remains conductive during the hold period. When the electrochromic layer 5 of the pixel is colored sufficiently, the electrochromic layer 5 of the pixel 1 is disconnected from the power line 8 by addressing the pixel 1 with a low voltage from data input 11. When a new image is fully written, the power line 8 can be powered down. In this embodiment, the gray-level ("intensity") of the color will be defined by the integral amount of charge passing into the electrochromic-layer 5 and hence by the time in which the electrochromic layer 5 or the working electrode 10 associated with said electrochromic layer 5 of the pixel 1 is connected to the power line 8.

Figure 6:
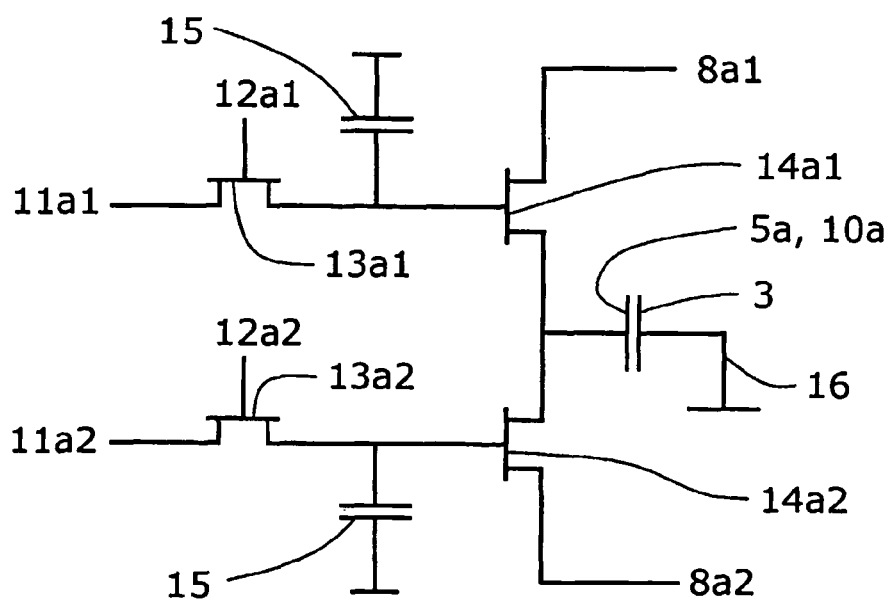
FIG. 6 discloses a simplified dual power line drive circuit for an electrochromic pixel in accordance with the present invention.

FIG. 6 illustrates a more complex pixel circuit with two power lines 8a1, 8a2, whereby an electrochromic layer 5a can be colored and bleached. The drive circuit is controllable via two column data inputs 11a1, 11a2 and two row select inputs 12a1, 12a2 providing control of application of power line voltage to an electrochromic layer 5a or the working electrode 10a associated with said electrochromic layer 5a of said pixel 1. The operation of the pixel circuit is as follows: The power lines 8a1, 8a2 are set to a bleaching voltage and a coloring voltage, respectively. The display is addressed with two voltages, where a high voltage causes a drive transistor 14a1, 14a2 to become conducting and a low voltage stops the drive transistor 14a1, 14a2 conducting. Column data 11a1 is used to select pixels 1 the electrochromic layer 5a of which requires bleaching. Column data 11a2 is used to select pixels 1 the electrochromic layer 5a of which requires coloring. Those pixels 1 the electrochromic layers 5a of which require coloring or bleaching are addressed at a high voltage. The drive transistor 14a1, 14a2 becomes conductive and bleaching or coloring begins. The storage capacitor 15 ensures that the drive transistor 14a1, 14a2 remains conductive during the hold period. When the electrochromic layer 5a of the pixel 1 is sufficiently colored or bleached, the electrochromic layer 5a or the working electrode 10a associated with said electrochromic layer 5a is disconnected from the power line 8a1, 8a2 by addressing the pixel 1 with a low voltage from data inputs 11a1, 11a2. When a new image is fully written, the power lines 8a1, 8a2 can be powered down. Again, in this embodiment, the gray-level ("intensity") of the color will be defined by the integral amount of charge passing into the electrochromic layer 5a and hence by the time in which the electrochromic layer 5a or the working electrode 10a associated with said electrochromic layer 5a is connected to the power line 8a1, 8a2. As in general no "reset" will be used, it will be necessary to know the previous state of the electrochromic-layer 5a before the correct amount of charge (or discharge) to reach the new gray level is supplied. This requires a signal processing approach, where the previous gray level is stored in a frame memory, the new gray level compared with the previous gray level and the required charge determined (via look-up-table or analytical function). This will be supplied to the pixel 1 as the pixel data via data inputs 11a1, 11a2.

Figure 7:
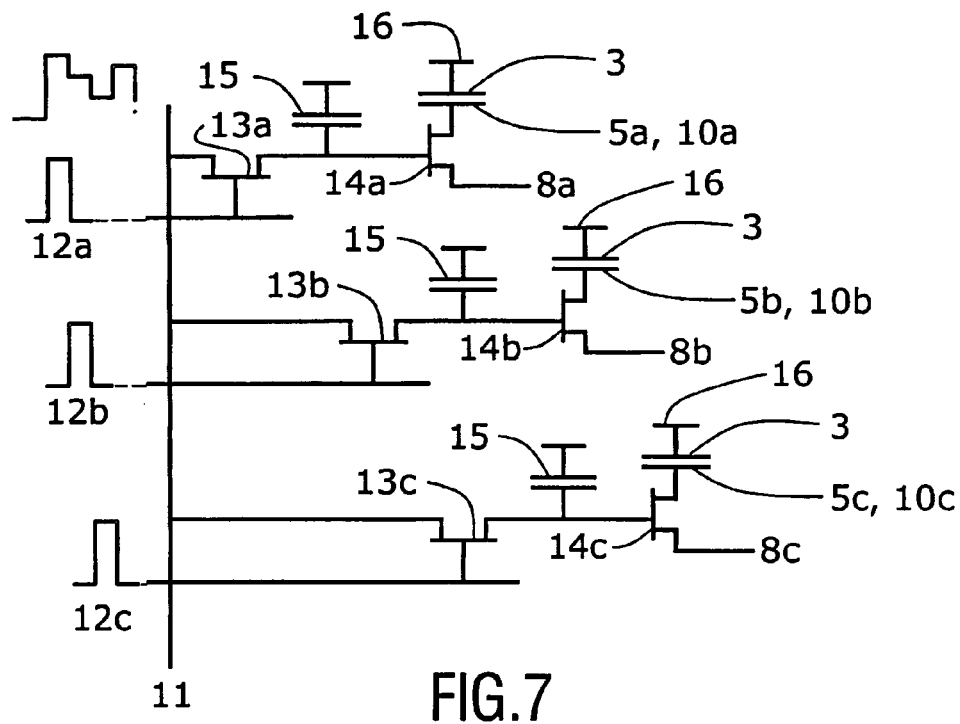
FIG. 7 discloses a simplified single power line drive circuit for a colored electrochromic pixel with multiple addressing rows.

In FIG. 7 an embodiment of the present invention is shown which could drive a color pixel 1 with three independently switchable electrochromic layers 5a, 5b, 5c. The electrochromic layers 5a, 5b, 5c or the working electrodes 10a, 10b, 10c associated with said electrochromic layers 5a, 5b, 5c are individually driven using the pixel circuit with a single power line according to FIG. 5. The pixel data is supplied in sequential manner to the three electrochromic layers 5a, 5b, 5c or the working electrodes 10a, 10b, 10c associated with said electrochromic layers 5a, 5b, 5c by addressing the three rows in consecutive line periods (as illustrated by the row select signals 12a, 12b, 12c on the left hand side of FIG. 7). The operation of the individual pixels is as discussed for the embodiment according to FIG. 5. In an alternative embodiment the two power line circuits of FIG. 6 could be implemented to drive the individual pixels. In this situation, every pixel would be provided with two row lines 12a1, 12a2, 12b1, 12b2, 12c1, 12c2 to connect the electrochromic layers 5a, 5b, 5c the working electrodes 10a, 10b, 10c associated with said electrochromic layers 5a, 5b, 5c to either of the power lines 8a1, 8a2, 8b1, 8b2, 8c1, 8c2. In the most general case, such a pixel would therefore be provided with six power lines. If electrochromic materials could be found which operate at the same voltages (either for bleaching or coloring) the number of power lines could be reduced by sharing power lines between two or more electrochromic layers or the working electrodes associated with said electrochromic layers. This would save space in the pixel (increase aperture) and reduce complexity and is therefore a preferred embodiment of the present invention.

Figure 8:
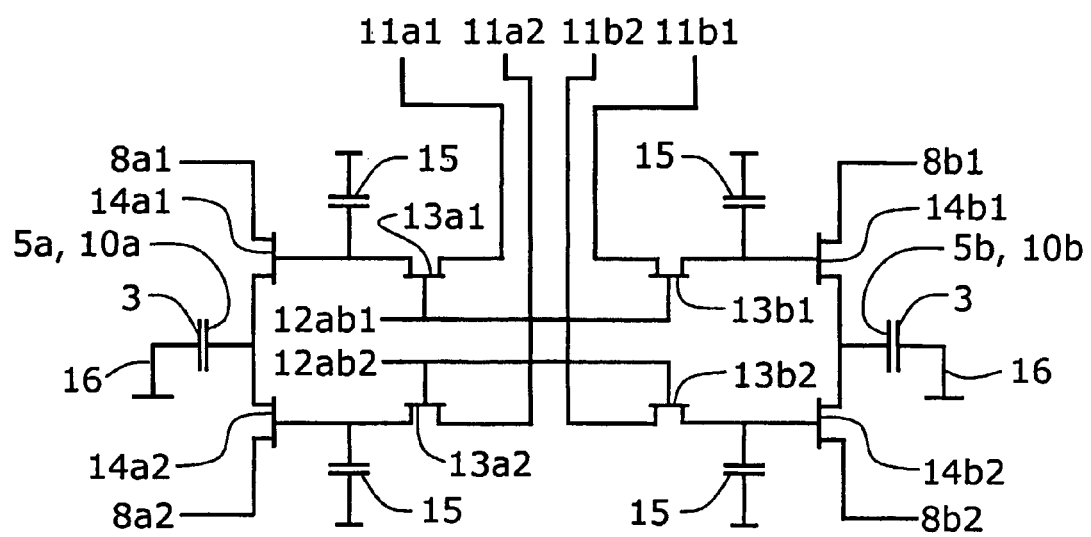
FIG. 8 discloses a simplified drive circuit for a colored electrochromic pixel with multiple data columns and two power lines per pixel.

FIG. 8 illustrates an embodiment of a drive circuit for a colored electrochromic pixel 1 with multiple data columns 11a1, 11a2, 11b1, 11b2 and two power lines 8a1, 8a2, 8b1, 8b2 per pixel 1, which could drive a color pixel 1 with two independently switchable electrochromic layers 5a, 5b (extension to three layers being trivial, but is not shown for clarity reasons). Here, the electrochromic layers 5a, 5b or the working electrodes 10a, 10b associated with said electrochromic layers 5a, 5b are individually driven using the pixel circuit with two power lines (FIG. 6). The pixel data is supplied in parallel to the two electrochromic layers 5a, 5b or the working electrodes 10a, 10b associated with said electrochromic layers 5a, 5b by addressing the four data columns 11a1, 11a2, 11b1, 11b2 in the same line period. The operation of the individual pixels is as discussed with respect to the embodiment of FIG. 6. In an alternative embodiment the single power line circuit of FIG. 5 could be implemented to drive the individual pixels. In this situation, every pixel would be provided with only one row line 12, and only a single column data line 11 per electrochromic layer would be required. Operation (according to the embodiment of FIG. 5) would again require that all the pixels are first reset (i.e. bleached) before the new image is written to the pixels. If electrochromic materials could be found which operate at the same voltages (either for bleaching or coloring) the number of power lines could be reduced by sharing power lines 8 between two or more electrochromic layers 5 or the working electrodes 10 associated with said electrochromic layers 5. This will save space in the pixel (increase aperture) and reduce complexity and is therefore a preferred embodiment of the invention.

A drive method for operating a pixel 1 of a display device according to any one of the above described embodiments comprises the steps of: providing at least one power line 8 which is selectively connectable to an electrochromic layer 5 or to a working electrode 10 associated with said electrochromic layer 5; selectively applying to said power line 8 a bleaching or coloring voltage; addressing the electrochromic layer 5 or the working electrode 10 associated with said electrochromic layer 5 which is to be bleached or colored; connecting said power line 8 to said electrochromic layer 5 or said working electrode 10 associated with said addressed electrochromic layer 5; retaining the connection of said power line 8 to said electrochromic layer 5 or said working electrode 10 associated with said electrochromic layer 5 addressed during a hold period; disconnecting said power line 8 from said electrochromic layer 5 or said working electrode 10 associated with said electrochromic layer 5 addressed.

In a further embodiment the drive method is applied to the additional electrochromic layers 5 of the pixel 1 through addressing the additional electrochromic layers 5 or the working electrodes 10 associated with said additional electrochromic layers 5 is in a sequential manner in consecutive line periods.

In a still further embodiment the drive method is applied to the additional electrochromic layers 5 of the pixel 1 by the addressing of the additional electrochromic layers 5 or the working electrodes 10 associated with said additional electrochromic layers 5 in a parallel manner in the same line period.

As illustrated by the above, a full color active-matrix electrochromic display which enables the generation of full color operation in each pixel cell has been described, where the driving electronics can advantageously be incorporated in a single active-matrix substrate layer (e.g. either glass or plastic) for each stack. The general electrochromic display advantages of high optical quality with respect to reflectivity, viewing angle, contrast and aperture being largely retained. The approach according to the present invention being advantageous in comparison to the prior art approach of stacking several electrochromic cells, each having their own active-matrix substrate layers, making such a prior art display quite thick, expensive and giving rise to severe parallax problems.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display device comprising a plurality of independently addressable pixels, wherein each of said pixel comprises: a first substrate; a counter-electrode; a second substrate; a stack of electrochromic-layers associated with said second substrate; an electrolyte disposed between said counter-electrode and said stack of electrochromic-layers; wherein said electrochromic-layers are each independently addressable for switching operation; and said electrochromic-layers are separated from each other by layers of an electrolyte.

2. The display device of claim 1, wherein an independently addressable working electrode is arranged between the second substrate and the electrochromic layer adjacent to the second substrate in the stack of electrochromic layers.

3. The display device of claim 1, wherein separate independently addressable working electrodes are associated with each respective electrochromic layer in the stack of electrochromic layers.

4. The display device of claim 1, wherein the electrolyte separating the electrochromic layers from each other is a solid-state like electrolyte.

5. The display device of claim 4, wherein said solid-state like electrolyte is a polymer electrolyte.

6. The display device of claim 1, wherein said stack of electrochromic layers comprises three monochromic electrochromic layers.

7. The display device of claim 1, wherein the counter-electrodes of the pixels of the display device are connected to form one common counter-electrode.

8. A driving method for operating a pixel of a display device according to claim 1, comprising the steps of:
   providing at least one power line which is selectively connectable to an electrochromic layer or to a working electrode associated with said electrochromic layer;
   selectively applying to said power line a bleaching or coloring voltage;
   addressing the electrochromic layer or the working electrode associated with said electrochromic layer which is to be bleached or colored;

connecting said power line to said electrochromic layer or said working electrode associated with said addressed electrochromic layer;

retaining the connection of said power line to said electrochromic layer or said working electrode associated with said addressed electrochromic layer during a hold period;

disconnecting said power line from said electrochromic layer or said working electrode associated with said addressed electrochromic layer.

9. The method of claim 8, wherein:
addressing of additional electrochromic layers or working electrodes associated with said additional electrochromic layers is performed in a sequential manner in consecutive line periods.

10. The method of claim 8, wherein:
addressing of additional electrochromic layers or working electrodes associated with said additional electrochromic layers is performed in parallel in the same line period.

* * * * *